US007260184B1

(12) United States Patent
Howard et al.

(10) Patent No.: US 7,260,184 B1
(45) Date of Patent: Aug. 21, 2007

(54) TEST SYSTEM AND METHOD FOR SCHEDULING AND RUNNING MULTIPLE TESTS ON A SINGLE SYSTEM RESIDING IN A SINGLE TEST ENVIRONMENT

(75) Inventors: Robert Howard, Raytown, MO (US); Jack Johnson, Harrisonville, MO (US); David Hoover, San Luis Obispo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 578 days.

(21) Appl. No.: 10/647,612

(22) Filed: Aug. 25, 2003

(51) Int. Cl.
*H04M 1/24* (2006.01)
*H04M 3/08* (2006.01)
*H04M 3/22* (2006.01)

(52) U.S. Cl. .................... 379/9; 379/10.01; 379/15.01; 702/108; 702/121; 702/123

(58) Field of Classification Search ............... 379/1.01, 379/9, 9.02, 9.04, 14, 10.01, 10.03, 15.01, 379/29.01, 29.09; 714/738, 741–742; 702/108, 702/118, 120–123
See application file for complete search history.

(56) References Cited

U.S. PATENT DOCUMENTS

| 4,910,760 | A | | 3/1990 | Reformato |
| 5,504,753 | A | | 4/1996 | Renger et al. |
| 5,528,748 | A | | 6/1996 | Wallace |
| 5,572,570 | A | | 11/1996 | Kuenzig |
| 5,729,588 | A | | 3/1998 | Chin et al. |
| 5,835,565 | A | | 11/1998 | Smith et al. |
| 5,835,566 | A | * | 11/1998 | Cowgill .................. 379/15.01 |
| 5,878,113 | A | | 3/1999 | Bhusri |
| 5,933,475 | A | | 8/1999 | Coleman |
| 5,987,633 | A | | 11/1999 | Newman et al. |
| 6,014,424 | A | | 1/2000 | Thai |
| 6,031,990 | A | | 2/2000 | Sivakumar et al. |
| 6,091,802 | A | | 7/2000 | Smith et al. |
| 6,269,150 | B1 | * | 7/2001 | Herrbach et al. .......... 379/1.01 |
| 6,272,208 | B1 | | 8/2001 | Kasrai |
| 6,366,645 | B1 | | 4/2002 | Khuc et al. |
| 6,587,543 | B1 | | 7/2003 | Howard et al. |
| 7,020,797 | B2 | * | 3/2006 | Patil .............................. 714/4 |
| 2002/0162059 | A1 | * | 10/2002 | McNeely et al. ........... 714/703 |

(Continued)

OTHER PUBLICATIONS

Hammer Technologies, Inc., Hammer System Release Notes—Release 2.5, Jun. 2000, Revision A, United States of America.

*Primary Examiner*—Binh K. Tieu (57) ABSTRACT

A test system and method for scheduling and running multiple tests on a single system residing in a single test environment. The test system comprises a processor operable to receive a request to run a selected test on the system at a selected start time, and determine a time slot for the selected test. The test system is also operable to identify any scheduled tests to be run on the system within the time slot, and identify any conflicts between the selected test and any scheduled tests. If no scheduled tests are identified or if no conflicts are identified, the processor is operable to schedule the selected test to run on the system at the selected start time. If conflicts are identified, the processor is preferably operable to determine an alternative start time for the selected test that avoids any conflicts. Various exemplary embodiments of the test system and associated method are provided.

36 Claims, 5 Drawing Sheets

U.S. PATENT DOCUMENTS

2003/0036865 A1* 2/2003 Zhuo et al. .................... 702/81
2004/0093180 A1* 5/2004 Grey et al. ................. 702/123
2005/0149800 A1* 7/2005 Jones et al. ................. 714/726

* cited by examiner

TEST SYSTEM AND METHOD FOR SCHEDULING AND RUNNING MULTIPLE TESTS ON A SINGLE SYSTEM RESIDING IN A SINGLE TEST ENVIRONMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to the scheduling and running of tests on a system, and more particularly to the scheduling and running of multiple tests on a single telecommunications system residing in a single test environment.

2. Description of Related Art

A telecommunications system will generally include various types of telecommunications equipment that are used to process calls routed through the system. Examples of such telecommunications equipment include a local user switch, a host computer, and numerous voice response units ("VRU's"). The calls routed through the telecommunications system may consist of voice signals routed between human users, data signals routed between computers or other machines (e.g., facsimile machines), or voice/data signals routed between a human user and a machine (e.g., a VRU).

Over the last decade, automated test systems have been developed that can be used to run a variety of different tests on a telecommunications system residing in a test environment for the purpose of testing new hardware and software features prior to procurement or implementation, or for troubleshooting hardware and software problems found in a particular production environment. In each of these tests, the test system transmits voice and/or data signals to the telecommunications system in such a manner as to simulate the types of calls that are typically routed through a telecommunications system. The test system then detects and evaluates the response voice and/or data signals produced by the telecommunications system to assess the operation thereof.

One type of test that can be run on a telecommunications system is a "validation test." In this test, the test system is used to validate the functionality of a new hardware or software feature of the telecommunications system. In a related test, the test system is used to test whether the newly added hardware or software feature has a negative impact on the functionality of existing hardware and software features of the telecommunications system. This test is known as a "regression test."

Another type of test that can be run on a telecommunications system is a "stress test." In this test, the test system is used to place a plurality of outbound calls to the telecommunications system for the purpose of testing the operation of the telecommunications system under a maximum load condition. In another test, the test system is used to place various outbound calls to the telecommunications system for the purpose of testing how different call mixes affect the overall performance of the telecommunications system. This test is known as a "performance test." Yet another type of test that can be run on the telecommunications system is a "fault tolerance test." In this test, the test system is used to simulate errors in the hardware or software features of the telecommunications system for the purpose of testing whether there is a proper switchover to redundant telecommunications equipment.

Most test systems are designed such that multiple test persons (each of which sits at his/her own workstation) together perform all of the required tests on the telecommunications system, which resides in a single test environment. Because the test persons must share the equipment resources of the telecommunications system, they must coordinate their test sessions such that only one test is being run on the telecommunications system at a particular point in time. As can be appreciated, the inability to run multiple tests on the telecommunications system simultaneously causes relatively long testing times. As a result, there is a delay in the overall time to market for new hardware and software features, and a delay in the time required to troubleshoot and repair hardware and software problems found in the production environment.

In an effort to overcome these problems, some testbeds have been designed to include two or more telecommunications systems that reside in separate test environments. Test persons are thus able to run concurrent tests on each of the telecommunications systems, thereby shortening the testing time and reducing the delays noted above. This solution is not ideal, however, in that the addition of one or more telecommunications systems (each of which resides in its own test environment) significantly increases the overall cost of the testbed. Also, the additional telecommunications system(s) occupy valuable space within the testbed.

BRIEF SUMMARY OF THE INVENTION

The present invention is directed to a test system and associated method for scheduling and running multiple tests on a single system residing in a single test environment. In an exemplary embodiment, the invention is applied to a test system used to schedule multiple tests on a single telecommunications system residing in a single test environment so as to allow more tests to be run simultaneously on the telecommunications system and thereby reduce testing time.

The test system includes a plurality of workstations and a plurality of associated test equipment. Also included is a server having a storage device and a processor operable to maintain in the storage device a database identifying various sets of relational data. One set of relational data comprises a plurality of tests and corresponding run times. Another set of relational data comprises a plurality of time intervals and corresponding scheduled tests. Yet another set of relational data comprises a plurality of tests and corresponding equipment lists. Still another set of relational data comprises a plurality of pieces of equipment and corresponding equipment conflicts.

The processor is operable to receive a request to run a selected test on the system at a selected start time (preferably from a test person at one of the workstations), and determine a time slot for the selected test. Preferably, the processor determines the time slot for the selected test by accessing the database to identify a run time for the selected test, and calculating the time slot based on the selected start time and the run time. The processor is also operable to identify any tests that have been previously scheduled to run on the system within the time slot. Preferably, the processor identifies these scheduled tests by partitioning the time slot into one or more time intervals, and accessing the database to identify any scheduled tests for these time intervals.

If one or more scheduled tests are identified, the processor is operable to identify any conflicts between the selected test and the scheduled tests. Preferably, the processor identifies these conflicts by accessing the database to identify: an equipment list for the selected test (which comprises one or more pieces of equipment needed to run the selected test); any equipment conflicts for the pieces of equipment needed to run the selected test; and an equipment list for each of the scheduled tests (which comprises one or more pieces of equipment needed to run the scheduled tests). The processor then compares the equipment conflicts with the pieces of equipment needed to run the scheduled tests to identify any conflicts between the selected test and the scheduled tests. A conflict is identified if one of the equipment conflicts matches one of the pieces of equipment needed to run the scheduled tests.

If no scheduled tests are identified or if no conflicts are identified, the processor is operable to schedule the selected test to run on the system at the selected start time. Preferably, the processor schedules the selected test by updating the database such that the selected test corresponds to each of the time intervals within the time slot. Then, the processor may notify the test person (on the appropriate workstation) of the scheduled start time for the selected test. If one or more conflicts are identified, the processor is preferably operable to determine an alternative start time for the selected test that avoid any conflicts.

Finally, the processor is operable to run the selected test on the system at the selected start time. Preferably, the processor is operable to verify that any prior scheduled tests have finished running before running the selected test on the system.

The present invention will be better understood from the following detailed description of the invention, read in connection with the drawings as hereinafter described.

DETAILED DESCRIPTION OF THE INVENTION

The present invention is directed to a test system and method for scheduling and running multiple tests on a single system residing in a single test environment. In exemplary embodiments, the invention is applied to a test system and method used to schedule and run multiple tests on a single telecommunications system residing in a single test environment. While the present invention will be described in detail hereinbelow with reference to these exemplary embodiments, it should be understood that the invention could be applied to other types of systems, such as computer systems, industrial manufacturing systems and the like.

Figure 1:
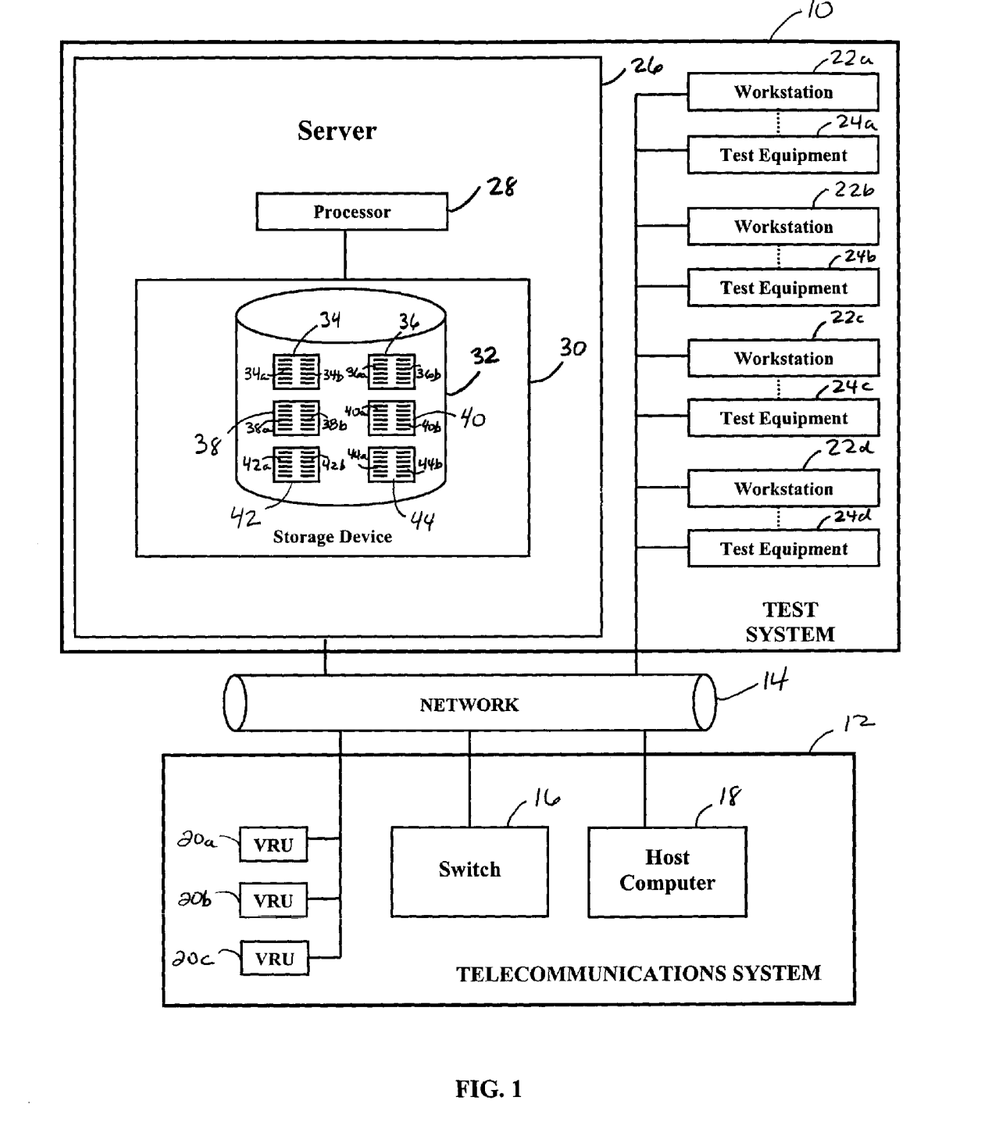
FIG. 1 is a block diagram of a test system operable to schedule and run multiple tests on a single telecommunications system residing in a single test environment, in accordance with an exemplary embodiment of the present invention.

Referring to FIG. 1, a test system in accordance with an exemplary embodiment of the present invention is designated generally as reference numeral 10. Test system 10 is connected to a telecommunications system 12 via a communication network 14. Communication network 14 functions to route voice and/or data signals between the various components of test system 10, between the various components of telecommunications system 12, or between test system 10 and telecommunications system 12. Communication network 14 may comprise an Ethernet network, a token ring network, an ATM network, or any other type of local or wide area network.

In the illustrated embodiment, telecommunications system 12 includes a local user switch 16, a host computer 18, and a plurality of VRU's 20a, 20b and 20c. Of course, telecommunications system 12 may also include other types of telecommunications equipment, as is known in the art. As such, local user switch 16, host computer 18, and VRU's 20a, 20b and 20c are merely included by way of example, and not by way of limitation, in order to facilitate the explanation of the present invention. It should be understood that the telecommunications equipment of telecommunications system 12 includes both hardware and software features that together support a variety of telephony applications.

Local user switch 16 may comprise any type of switch that is capable of processing voice and data signals. In operation, switch 16 functions to route a call to the appropriate destination, such as to a particular VRU. In the illustrated embodiment, switch 16 does not have resident intelligence, but instead utilizes the external intelligence of host computer 18. An example of such a switch is the SDS-1000 switch sold by Summa Four, Inc. Alternatively, a switch with resident intelligence could also be used, thereby eliminating the need for a host computer. Examples of such a switch include the ESS™ family of switches sold by AT&T Network Systems, and, the DMS family of switches sold by Nortel Networks.

Host computer 18 may comprise any type of mainframe computer that is capable of performing a database lookup to instruct local user switch 16 of the appropriate destination to route a call. Examples of such a computer include the Tandem K-1000 computer sold by Compaq Computer Corporation, the RS/6000 computer sold by IBM, and the HP 9000 computer sold by Hewlett-Packard Company.

VRU's 20a, 20b and 20c may comprise any type of voice response units that are capable of receiving and processing DTMF and/or voice signals for an automated messaging system. Examples of such VRU's are the voice response units sold by Brite Voice Systems. It should be understood that although three VRU's are shown in the illustrated embodiment, a telecommunications system will typically include numerous VRU's.

Referring still to FIG. 1, test system 10 of the illustrated embodiment includes a plurality of workstations 22a, 22b, 22c and 22d, a plurality of telecommunications test equipment 24a, 24b, 24c and 24d, and a server 26 (each of which will be described in detail hereinbelow). Server 26 and workstations 22a, 22b, 22c and 22d preferably operate in a client-server environment, wherein each of workstations 22a, 22b, 22c and 22d operate as the "client" and server 26 operates as the "server." As such, the software applications and databases residing on server 26 can be run on any of workstations 22a, 22b, 22c and 22d via communication network 14.

Workstations 22a, 22b, 22c and 22d each comprise a computing system, such as a personal computer, which may be used by a test person to initiate certain processes of the invention (including the scheduling of multiple tests on telecommunications system 12). Each of workstations 22a, 22b, 22c and 22d preferably includes a graphical user interface ("GUI"). As such, the software applications residing on server 26 may be automatically run on workstations 22a, 22b, 22c and 22d via the GUI interface during the course of the testing process. Although four workstations have been shown in the illustrated embodiment, it should be understood that a test system may include any number of workstations that are needed to adequately test telecommunications system 12.

Telecommunications test equipment 24a, 24b, 24c and 24d each comprise test equipment that is capable of testing the functionality of telecommunications system 12. Preferably, each piece of test equipment 24a, 24b, 24c and 24d is associated with one of workstations 22a, 22b, 22c and 22d. As is known in the art, each piece of test equipment 24a, 24b, 24c and 24d will typically include a plurality of "originating party" channels and a plurality of "terminating party" channels that are used to simulate the types of calls that are typically routed through telecommunications system 12. Examples of such test equipment include the Hammer testing system sold by Hammer Technologies, the Sage 930 testing system sold by Sage Instruments, the Chameleon Protocol Analyzer sold by Tekelec, Inc., and the AM2 Niagara® and Crescendo® testing systems sold by Ameritec.

Server 26 comprises a computing system that includes at least one processor 28 and at least one storage device 30. An example of such a server is the ProLiant® server sold by Compaq Computer Corporation. Processor 28 is operable to execute computer-readable instructions stored on a computer-readable medium to perform the various processes of the present invention, as will be described in greater detail hereinbelow. Preferably, the computer-readable instructions are coded in a high-level computer language that is well-suited to the client-server environment, such as the Visual Basic® object-oriented programming language sold by Microsoft Corporation. The computer-readable medium may include any type of computer memory, such as floppy disks, conventional hard disks, CD-ROMS, Flash ROMS, nonvolatile ROM and RAM.

Processor 28 is operable to maintain in storage device 30 a database 32 that identifies various sets of relational data, including tests/run times, time intervals/scheduled tests, tests/equipment lists, equipment/equipment conflicts, tests/test scripts and scheduled tests/test results. Each set of relational data is preferably maintained in a separate table within database 32, although other database configurations could also be used. Of course, it should be understood that server 26 may include any relational database software that is suitable for maintaining the various sets of relational data in storage device, such as the Microsoft Access® software sold by Microsoft Corporation, the Oracle® software sold by Oracle Corporation, or the SQL software sold by Sybase, Inc.

A first set of relational data 34 maintained within database 32 comprises a plurality of tests 34a and the run times 34b corresponding to each of tests 34a. Tests 34a consist of the various different tests that can be run on telecommunications system 12, such as a validation test, a regression test, a stress test, a performance test and a fault tolerance test. Run times 34b consist of the estimated lengths of time required to run each of tests 34a. The first set of relational data will hereinafter be referred to as the "tests/run times table 34."

A second set of relational data 36 maintained within database 32 comprises a plurality of time intervals 36a and the scheduled tests 36b corresponding to each of time intervals 36a. Time intervals 36a consist of specified increments of time that preferably span every minute of every hour of every day in a calendar year. For example, if the specified increment of time is one second, there will be a time interval for 12:00:00 to 12:00:01, another time interval for 12:00:01 to 12:00:02, another time interval for 12:00:02 to 12:00:03, and so on. Scheduled tests 36b consist of the tests that have been previously scheduled to run within each of time intervals 36a. For example, if a particular validation test has been previously scheduled to start at 06:00:00 and the estimated run time for the test is 5 seconds, then scheduled tests 36b corresponding to time intervals 06:00:00 to 06:00:01, 06:00:01 to 06:00:02, 06:00:02 to 06:00:03, 06:00:03 to 06:00:04 and 06:00:04 to 06:00:05 will each consist of the validation test. The second set of relational data will hereinafter be referred to as the "time intervals/scheduled tests table 36."

A third set of relational data 38 maintained within database 32 comprises a plurality of tests 38a and the equipment lists 38b corresponding to each of tests 38a. Tests 38a consist of the various different tests that can be run on telecommunications system 12 (which are preferably the same as tests 34a of tests/run times table 34). Equipment lists 38b consist of the pieces of equipment within telecommunications system 12 that are needed to run each of tests 38a. One skilled in the art will understand that these pieces of equipment may also include the "out of service" state for any of the pieces of equipment within telecommunications system 12. The third set of relational data will hereinafter be referred to as the "tests/equipment lists table 38."

A fourth set of relational data 40 maintained within database 32 comprises a plurality of pieces of equipment 40a and the equipment conflicts 40b corresponding to each of the pieces of equipment 40a. Pieces of equipment 40a include each of the pieces of equipment within telecommunications system 12, such as switch 16, host computer 18, VRU 20a, VRU 20b and VRU 20c. One skilled in the art will understand that pieces of equipment 40a may also include the "out of service" state for each of the pieces of equipment within telecommunications system 12. Equipment conflicts 40b consist of the conflicting equipment for each of the pieces of equipment 40a. For example, for piece of equipment 40a consisting of VRU 20a, equipment conflict 40b may consist of VRU 20a. That is, if a test requires the use of VRU 20a, then an equipment conflict would exist with another test that also requires the use of VRU 20a. As another example, for piece of equipment 40a consisting of switch 16, equipment conflict 40b may consist of the "out of service" state for switch 16. That is, if a test requires the use of switch 16, then an equipment conflict would exist with another test that requires switch 16 to be "out of service." The fourth set of relational data will hereinafter be referred to as the "equipment/equipment conflicts table 40."

A fifth set of relational data 42 maintained within database 32 comprises a plurality of tests 42a and the test scripts 42b corresponding to each of test 42a. Tests 42a consists of the various different tests that can be run on telecommunication system 12 (which are preferably the same as tests 34a of tests/run times table 34 and tests 38a of tests/equipment list table 38). Test scripts 42b consist of the various test scripts that may be run to test the functionality of telephony applications residing on telecommunication system 12 and/ or to validate the data generated as a result of such tests. Examples of the various test scripts are disclosed in U.S. Pat. No. 6,587,543 entitled "System and Method for the Automated Testing of a Telecommunications System" assigned to the assignee of the present application, which is incorporated herein by reference. The fifth set of relational data will hereinafter be referred to as the "tests/test scripts table 42."

A sixth set of relational data 44 maintained within database 32 comprises a plurality of scheduled tests 44a and the test results 44b corresponding to each of scheduled tests 44a. Scheduled test 44a consists of the tests that have been scheduled to run on telecommunication system 12 (which are preferably the same as scheduled test 36b of time intervals/scheduled tests table 36). Test results 44b consist of the test results for each of scheduled tests 44a, such as an "overall pass" or an "overall fail." The sixth set of relational data will hereinafter be referred to as the "scheduled tests/test results table 44."

Referring still to FIG. 1, processor 28 is operable to receive a request to run a selected test on telecommunications system 12 at a selected start time. It should be understood that such a request preferably originates from a test person on one of workstations 22a, 22b, 22c and 22d. For example, a test person on workstation 22a may input a request to run a particular validation test with a start time of 08:00:00. Upon receipt of the request, processor 28 is operable to determine a time slot for the selected test. Preferably, processor 28 determines the time slot for the selected test by accessing database 32 to identify the run time for the selected test from tests/run times table 34, and calculating the time slot based on the selected start time and the run time. For example, the run time for the validation test may consist of 3 seconds such that the time slot will consist of 08:00:00 to 08:00:03.

Processor 28 is then operable to identify any tests that have been previously scheduled to run on telecommunications system 12 within the time slot. Preferably, the processor identifies these scheduled tests by partitioning the time slot into one or more time intervals, and accessing database 32 to identify any scheduled tests for the time intervals from time intervals/scheduled tests table 36. For example, the time slot consisting of 08:00:00 to 08:00:03 may be partitioned into the time intervals 08:00:00 to 08:00:01, 08:00:01 to 08:00:02 and 08:00:02 to 08:00:03, and the scheduled tests for each of these time intervals may then be identified (which may consist of no scheduled tests, one scheduled test, two scheduled tests, or more).

If one or more scheduled tests are identified, processor 28 is operable to identify any conflicts between the selected test and the scheduled tests. Preferably, processor 28 identifies any conflicts by accessing database 32 to identify an equipment list for the selected test from tests/equipment list table 38 (which comprises one or more pieces of equipment needed to run the selected test). Processor 28 also accesses database 32 to identify an equipment list for each of the scheduled tests from tests/equipment table 38 (which comprises one or more pieces of equipment needed to run the scheduled tests). Processor 28 further accesses database 32 to identify any equipment conflicts for each of the pieces of equipment needed to run the selected test from equipment/equipment conflicts table 40. Processor 28 then compares the equipment conflicts with the pieces of equipment needed to run the scheduled tests to identify any conflicts between the selected test and the scheduled tests. It should be understood that a conflict is identified if one of the equipment conflicts matches one of the pieces of equipment needed to run the scheduled tests. Alternatively, it should be understood that processor 28 may identify any conflicts by comparing the equipment conflicts for the scheduled tests (as opposed to the selected test) with the pieces of equipment needed to run the selected test (as opposed to the scheduled tests).

If no scheduled tests are identified, or, if one or more scheduled tests are identified but no conflicts are identified, processor 28 is operable to schedule the selected test to run on telecommunications system 12 at the selected start time. Preferably, processor 28 schedules the selected test by updating database 32 such that the selected test corresponds to each of the time intervals within the calculated time slot within time intervals/scheduled tests table 36. For example, the database may be updated such that the validation test corresponds to each of the time intervals 08:00:00 to 08:00:01, 08:00:01 to 08:00:02 and 08:00:02 to 08:00:03. Processor 28 may then be operable to notify the test person (on the appropriate one of workstations 22a, 22b, 22c and 22d) that the selected test has been scheduled to run at the selected start time.

If one or more scheduled tests are identified and one or more conflicts are identified, processor 28 is preferably operable to determine an alternative start time for the selected test that avoids any conflicts. Preferably, processor 28 determines the alternative start time by adding a predetermined time increment (e.g., 1 minute) to the selected start time and repeating the above process until either no scheduled tests are identified or no conflicts are identified. Alternatively, processor 28 may notify the test person (on the appropriate one of workstations 22a, 22b, 22c and 22d) that conflicts were identified and prompt the test person to enter an alternative start time for the selected test. Upon receipt of the alternative start time, processor 28 may repeat the above process until either no scheduled tests are identified or no conflicts are identified. In either case, processor 28 is operable to schedule the selected test to run on telecommunications system 12 at the alternative start time, and notify the test person (on the appropriate one of workstations 22a, 22b, 22c and 22d) that the selected test has been scheduled to run at the alternative start time.

Of course, it should be understood that processor 28 is operable to schedule multiple tests to run on telecommunications system 12 at multiple start times, as described hereinabove.

Referring still to FIG. 1, processor 28 is preferably operable to automatically run each of the scheduled tests on telecommunication system 12 at the scheduled start times. That is, the actual running of the scheduled tests on telecommunications system 12 is preferably automated (although the scheduled tests could alternatively be manually run on telecommunications system 12). To do so, processor 28 is operable to determine if it is time to run a scheduled test. Preferably, processor 28 makes this determination by accessing database 32 to identify any scheduled tests for the current time interval from time intervals/scheduled tests table 36. It should be understood that processor 28 continues this process until a scheduled test is identified.

When a scheduled test is identified, processor 28 is operable to verify that all prior scheduled tests have finished running before running the scheduled test. For example, if a prior scheduled test has an actual run time that is greater than the estimated run time 34b from tests/run times table 34, it is possible that the prior scheduled test may overlap into the time slot for the next scheduled test. If one or more prior scheduled tests are still running, processor 28 is operable to wait until such prior scheduled test(s) have finished running.

When all prior scheduled tests have finished running, processor 28 is operable to run the scheduled test. Preferably, processor 28 runs the scheduled test by accessing database 32 to identify a test script for the scheduled test from tests/test scripts table 42. Processor 28 then executes the test script to thereby run the scheduled test.

Finally, processor 28 is operable to determine if the scheduled test failed. If the scheduled test failed, processor 28 is operable to log the test result into database 32 as an "overall fail." However, if the scheduled test did not fail, processor 28 is operable to log the test result into database 32 as an "overall pass." Preferably, processor 28 logs the test result into database 32 by updating database 32 such that the test result (either "overall fail" or "overall pass") corresponds to the scheduled test within scheduled tests/test results table 44.

Of course, it should be understood that processor 28 is preferably operable to automatically run multiple scheduled tests on telecommunications system 12, as described hereinabove.

Figure 2A:
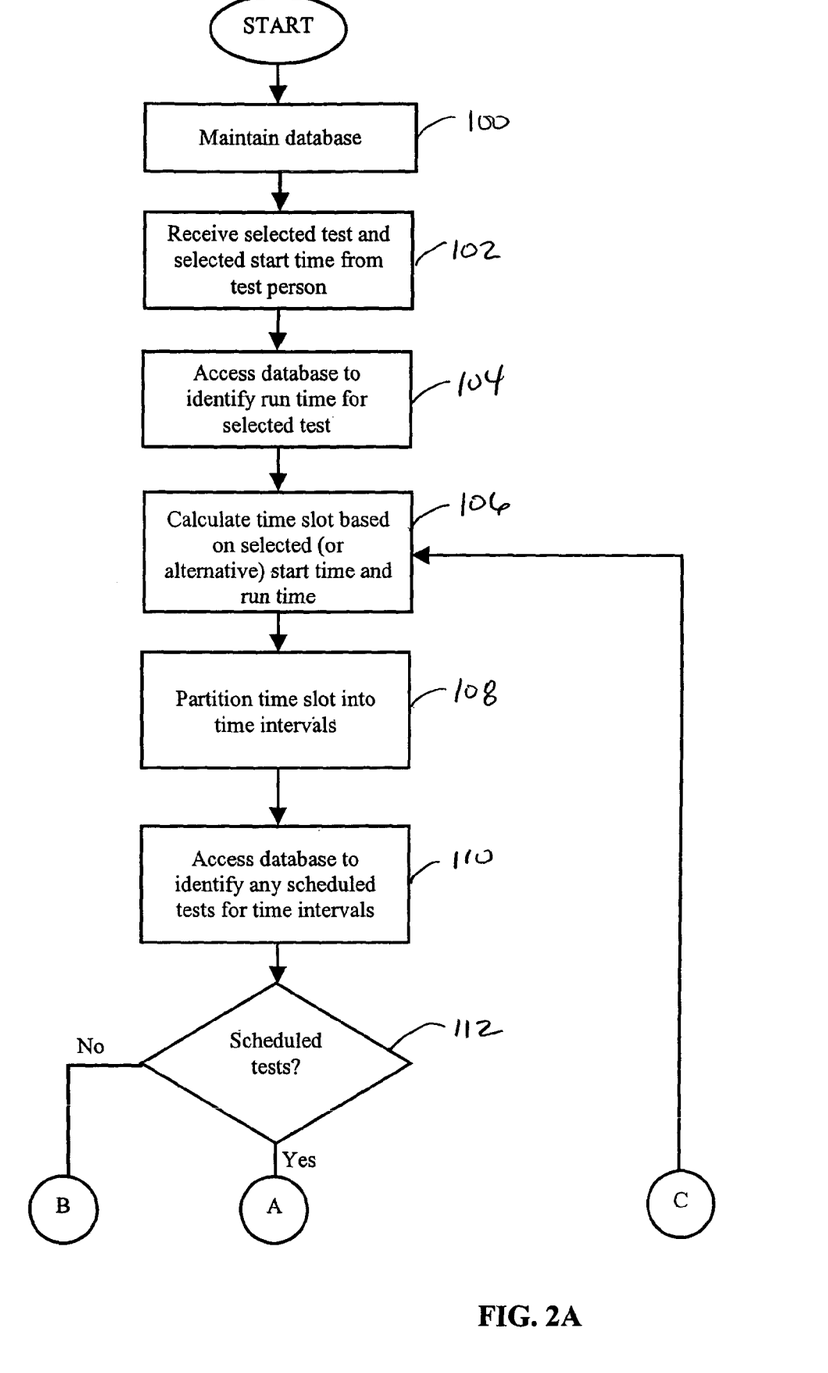
FIGS. 2A and 2B is a flow chart of a computerized method for scheduling multiple tests on a single system residing in a single test environment, in accordance with an exemplary embodiment of the present invention.
Figure 2B:
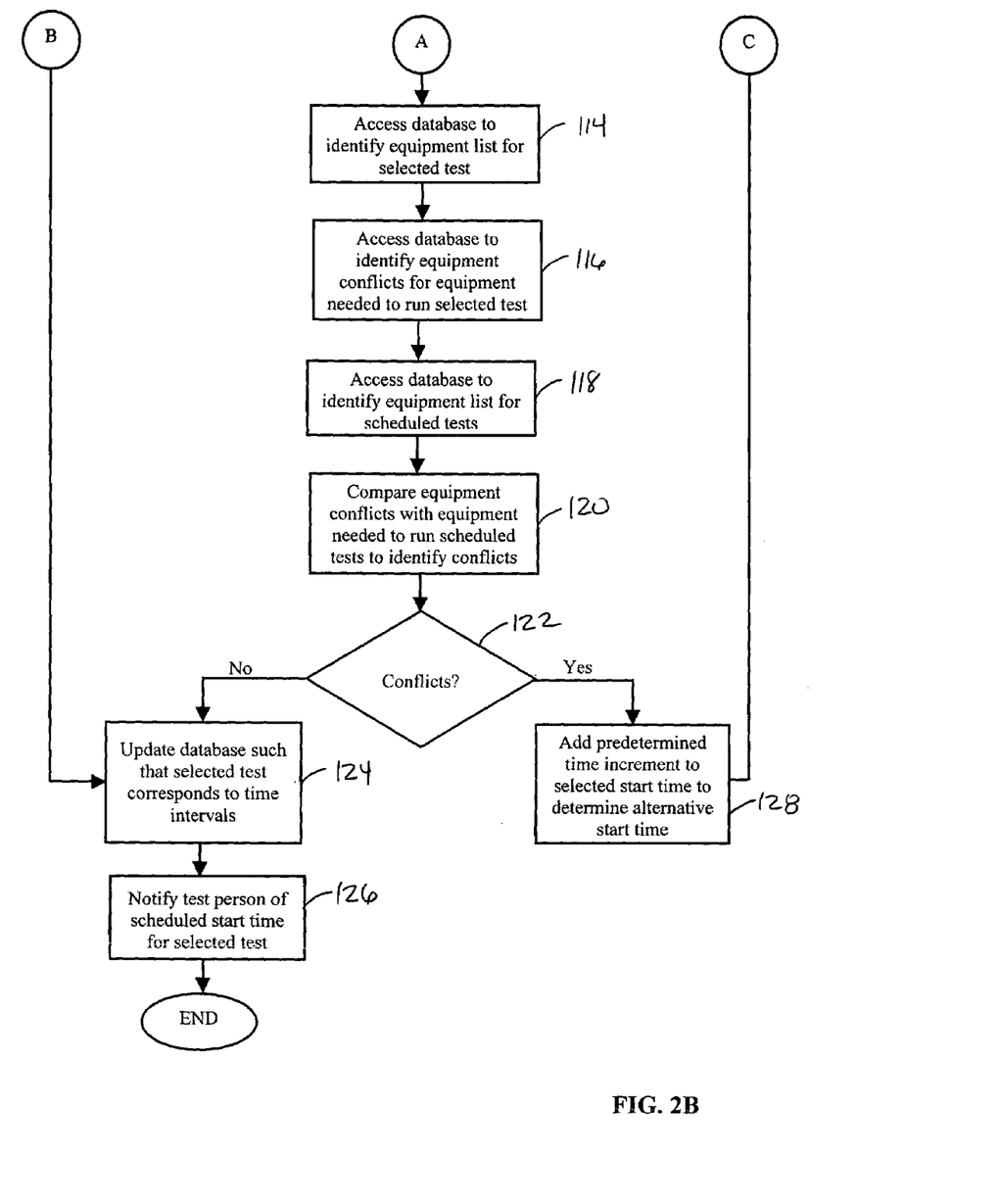

Referring now to FIGS. 2A and 2B, a flow chart of a computerized method for scheduling multiple tests on a system (e.g., telecommunications system 12) is provided with reference to blocks 100-128. At block 100, a database is maintained that identifies various sets of relational data, including tests/run times, time intervals/scheduled tests, tests/equipment lists, and equipment/equipment conflicts.

At block 102, a request is received to run a selected test on the system at a selected start time. Upon receipt of the request, a time slot is determined for the selected test. Preferably, the time slot is determined by accessing the database to identify a run time for the selected test at block 104, and then calculating the time slot based on the selected start time and the run time at block 106.

Next, any tests that have been previously scheduled to run on the system within the time slot are identified. Preferably, the scheduled tests are identified by partitioning the time slot into one or more time intervals at block 108, and then accessing the database to identify any scheduled tests for the time intervals at block 110.

Next, at block 112, a determination is made whether any scheduled tests are identified. If no scheduled tests are identified, the selected test is scheduled to run on the system at the selected start time. Preferably, the selected test is scheduled at block 124 by updating the database such that the selected test corresponds to each of the time intervals within the calculated time slot. Then, at block 126, a test person may be notified that the selected test has been scheduled to run at the selected start time.

If one or more scheduled tests are identified, any conflicts between the selected test and the scheduled tests are identified. Preferably, at block 114, the database is accessed to identify an equipment list for the selected test (which may comprise one or more pieces of equipment needed to run the selected test). At block 116, the database is accessed to identify any equipment conflicts for each of the pieces of equipment needed to run the selected test. At block 118, the database is accessed to identify an equipment list for each of the scheduled tests (which may comprise one or more pieces of equipment needed to run the scheduled tests). Then, at block 120, the equipment conflicts are compared with the pieces of equipment needed to run the scheduled tests to identify any conflicts between the selected test and the scheduled tests. Alternatively, it should be understood that any conflicts may be identified by comparing the equipment conflicts for the scheduled tests (as opposed to the selected test) with the pieces of equipment needed to run the selected test (as opposed to the scheduled tests).

Next, at block 122, a determination is made whether any conflicts are identified. If no conflicts are identified, the selected test is scheduled to run on the system at the selected start time. Preferably, the selected test is scheduled at block 124 by updating the database such that the selected test corresponds to each of the time intervals within the calculated time slot. Then, at block 126, a test person may be notified that the selected test has been scheduled to run at the selected start time.

If one or more conflicts are identified, an alternative start time for the selected test is determined that avoids any conflicts. Preferably, the alternative start time is determined by adding a predetermined time increment to the selected start time at block 128, and returning to block 106 whereby the above process will be repeated until either no scheduled tests are identified or no conflicts are identified. Alternatively, a test person may be notified that conflicts were identified and the test person will be prompted to enter an alternative start time for the selected test. Upon receipt of the alternative start time, the above process beginning at block 106 will be repeated until either no scheduled tests are identified or no conflicts are identified. In either case, the selected test may then be scheduled to run on the system at the alternative start time, and the test person may be notified that the selected test has been scheduled to run at the alternative start time.

Of course, it should be understood that the above method may be repeated to thereby schedule multiple tests to run on the system at multiple start times, as described hereinabove.

Figure 3A:
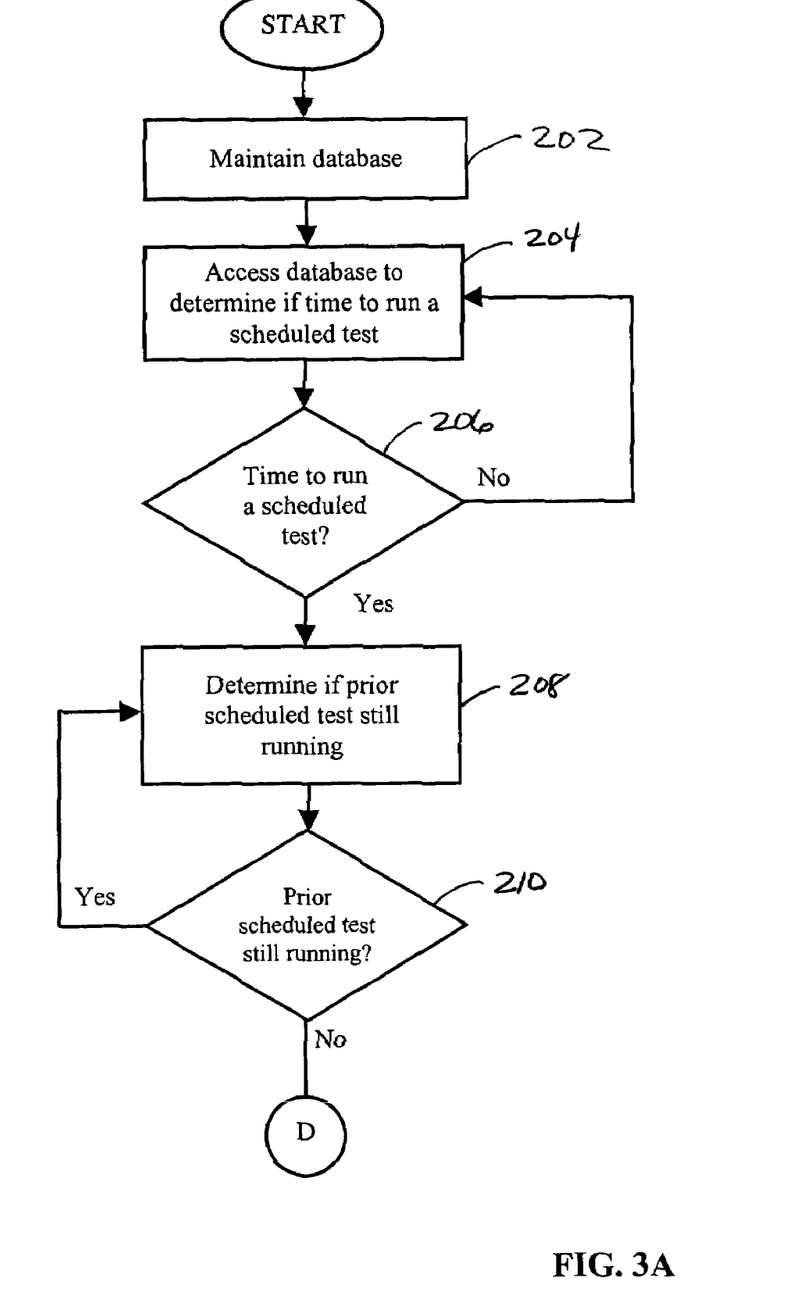
FIGS. 3A and 3B is a flow chart of a computerized method for running multiple tests on a single system residing in a single test environment, in accordance with an exemplary embodiment of the present invention.
Figure 3B:
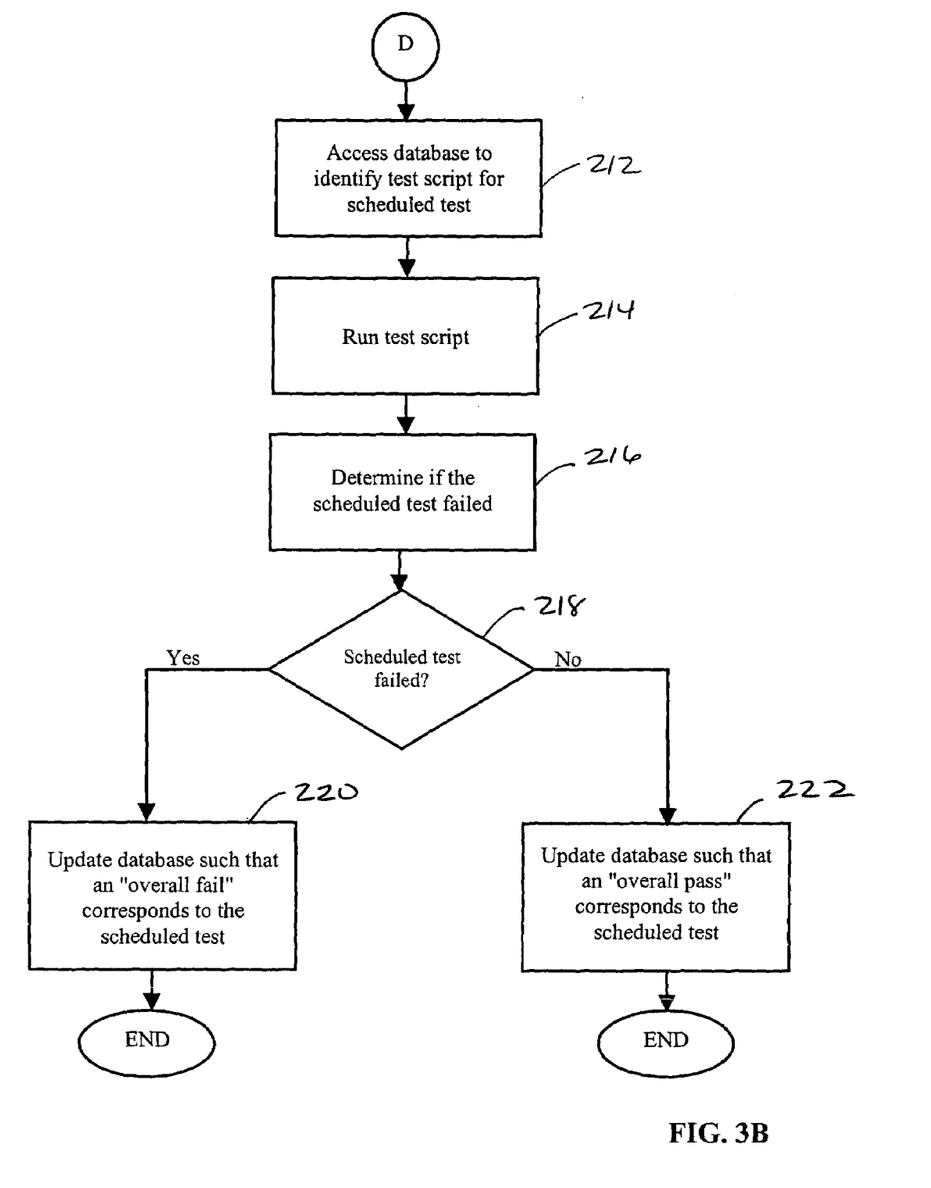

Referring now to FIGS. 3A and 3B, a flow chart of a computerized method for running each of the scheduled tests on the system (e.g., telecommunications system 12) at the scheduled start times is provided with reference to blocks 202-222. At block 202, a database is maintained that identifies various sets of relational data, including tests/test scripts and scheduled tests/test results (in addition to tests/run times, time intervals/scheduled tests, tests/equipment lists, and equipment/equipment conflicts, as described above with reference to FIGS. 2A and 2B).

At blocks 204 and 206, a determination is made whether it is time to run a scheduled test. Preferably, this determination is made by accessing the database to identify any scheduled tests for the current time interval. It should be understood that blocks 204 and 206 are repeated until a scheduled test is identified for the a specific time interval.

When a scheduled test is identified, at blocks 208 and 210, a determination is made whether any prior scheduled tests are still running. If one or more prior scheduled tests are still running, blocks 208 and 210 are repeated until all prior scheduled tests have finished running. When all prior scheduled tests have finished running, at block 212, the database is accessed to identify a test script for the scheduled test. Then, at block 214, the test script is executed to thereby run the scheduled test.

Finally, at blocks 216 and 218, a determination is made whether the scheduled test failed. If the scheduled test failed, the test result is logged into the database as an "overall fail" at block 220. However, if the scheduled test did not fail, the test result is logged into the database as an "overall pass" at block 222.

Of course, it should be understood that the above method may be repeated to thereby run multiple scheduled tests on the system, as described hereinabove.

It will be appreciated by one skilled in the art that multiple test persons (e.g., on workstations 22*a*, 22*b*, 22*c* and 22*d*)

may utilize the test system and method described and illustrated hereinabove to schedule multiple tests on a system (e.g., telecommunications system 12). It should be understood that a test person may enter a single request to schedule a selected test at a selected start time, or may enter a group of requests to schedule a plurality of selected tests at a plurality of selected start times (in which case the test system will repeat the method for each of the requests until all of the requests have been scheduled). By allowing more tests to be run simultaneously on the system (i.e., when no conflicts are identified), the testing times will be reduced to thereby accelerate the overall time to market for new hardware and software features, as well as shorten the time required to troubleshoot and repair hardware and software problems found in the production environment.

While the test system and method of the present invention have been described and illustrated hereinabove with reference to exemplary embodiments, it should be understood that various modifications could be made to these embodiments without departing from the scope of the present invention. Therefore, the present invention is not to be limited to the specific test system and method disclosed hereinabove, except insofar as such limitations are included in the following claims.

What is claimed and desired to be secured by Letters Patent is as follows:

1. A computerized method for scheduling multiple tests on a single system residing in a single test environment, comprising:
   (a) receiving a request to run a selected test on said system at a selected start time;
   (b) determining a time slot for said selected test;
   (c) identifying any scheduled tests to be run on said system within said time slot;
   (d) identifying any conflicts between said selected test and said any scheduled tests; and
   (e) if none of said scheduled tests are identified or if none of said conflicts are identified, scheduling said selected test to run on said system at said selected start time.

2. The method of claim 1, wherein said system is a telecommunications system comprising one or more pieces of telecommunications equipment selected from the following group: a switch, a host computer, a voice response unit, and combinations thereof.

3. The method of claim 1, further comprising maintaining a database identifying a plurality of tests and corresponding run times, and wherein step (b) comprises:
   accessing said database to identify a run time for said selected test; and
   calculating said time slot based on said selected start time and said run time.

4. The method of claim 1, further comprising maintaining a database identifying a plurality of time intervals and corresponding scheduled tests, and wherein step (c) comprises:
   partitioning said time slot into one or more time intervals;
   accessing said database to identify said any scheduled tests for said time intervals.

5. The method of claim 4, wherein step (e) comprises updating said database such that said selected test corresponds to each of said time intervals.

6. The method of claim 1, further comprising maintaining a database identifying a plurality of tests and corresponding equipment lists, said database also identifying a plurality of pieces of equipment and corresponding equipment conflicts, and wherein step (d) comprises:
   accessing said database to identify an equipment list for said selected test, said equipment list for said selected test comprising one or more pieces of equipment needed to run said selected test;
   accessing said database to identify any equipment conflicts for said pieces of equipment needed to run said selected test;
   accessing said database to identify an equipment list for each of said scheduled tests, said equipment lists for said scheduled tests comprising one or more pieces of equipment needed to run said scheduled tests; and
   comparing said equipment conflicts with said pieces of equipment needed to run said scheduled tests to identify said any conflicts between said selected test and said scheduled tests.

7. The method of claim 6, wherein a conflict is identified if one of said equipment conflicts matches one of said pieces of equipment needed to run said scheduled tests.

8. The method of claim 1, further comprising:
   (f) if one or more of said conflicts are identified, determining an alternative start time for said selected test that avoids said conflicts.

9. The method of claim 1, further comprising:
   (f) running said selected test on said system at said selected start time.

10. The method of claim 9, wherein step (f) further comprises verifying that any prior scheduled tests have finished running before running said selected test on said system.

11. A computerized method for scheduling multiple tests on a single telecommunications system residing in a single test environment, comprising:
   (a) maintaining a database identifying a plurality of tests and corresponding run times, said database also identifying a plurality of time intervals and corresponding scheduled tests;
   (b) receiving a request to run a selected test on said telecommunications system at a selected start time;
   (c) determining a time slot for said selected test by accessing said database to identify a run time for said selected test and calculating said time slot based on said selected start time and said run time;
   (d) identifying any scheduled tests to be run on said telecommunications system within said time slot by partitioning said time slot into one or more time intervals and accessing said database to identify any scheduled tests for said time intervals;
   (e) identifying any conflicts between said selected test and said any scheduled tests; and
   (f) if none of said scheduled tests are identified or if none of said conflicts are identified, scheduling said selected test to run on said telecommunications system at said selected start time by updating said database such that said selected test corresponds to each of said time intervals.

12. The method of claim 11, further comprising:
   (g) if one or more of said conflicts are identified, determining an alternative start time for said selected test that avoids said conflicts.

13. The method of claim 11 further comprising maintaining a database identifying a plurality of tests and corresponding equipment lists, said database also identifying a plurality of pieces of equipment and corresponding equipment conflicts, and wherein step (e) comprises:
   accessing said database to identify an equipment list for said selected test, said equipment list for said selected test comprising one or more pieces of equipment needed to run said selected test;

accessing said database to identify any equipment conflicts for said pieces of equipment needed to run said selected test;

accessing said database to identify an equipment list for each of said scheduled tests, said equipment lists for said scheduled tests comprising one or more pieces of equipment needed to run said scheduled tests; and comparing said equipment conflicts with said pieces of equipment needed to run said scheduled tests to identify said any conflicts between said selected test and said scheduled tests.

14. The method of claim 13, wherein a conflict is identified if one of said equipment conflicts matches one of said pieces of equipment needed to run said scheduled tests.

15. A test system for scheduling multiple tests on a single system residing in a single test environment, said test system comprising at least one processor operable to:

receive a request to run a selected test on said system at a selected start time;

determine a time slot for said selected test;

identify any scheduled tests to be run on said system within said time slot;

identify any conflicts between said selected test and said any scheduled tests; and if none of said scheduled tests are identified or if none of said conflicts are identified, schedule said selected test to run on said system at said selected start time.

16. The test system of claim 15, wherein said system is a telecommunications system comprising one or more pieces of telecommunications equipment selected from the following group: a switch, a host computer, a voice response unit, and combinations thereof.

17. The test system of claim 15, further comprising a storage device, wherein said processor is operable to maintain in said storage device a database identifying a plurality of tests and corresponding run times, and wherein said processor is operable to determine said time slot for said selected test by:

accessing said database to identify a run time for said selected test; and calculating said time slot based on said selected start time and said run time.

18. The test system of claim 15, further comprising a storage device, wherein said processor is operable to maintain in said storage device a database identifying a plurality of time intervals and corresponding scheduled tests, and wherein said processor is operable to identify said any scheduled tests to be run on said system within said time slot by:

partitioning said time slot into one or more time intervals; and accessing said database to identify said any scheduled tests for said time intervals.

19. The test system of claim 18, wherein said processor is operable to schedule said selected test to run on said system at said start time by:

updating said database such that said selected test corresponds to each of said time intervals.

20. The test system of claim 15, further comprising a storage device, wherein said processor is operable to maintain in said storage device a database identifying a plurality of tests and corresponding equipment lists, said database also identifying a plurality of pieces of equipment and corresponding equipment conflicts, and wherein said processor is operable to identify said any conflicts between said selected test and said scheduled tests by:

accessing said database to identify an equipment list for said selected test, said equipment list for said selected test comprising one or more pieces of equipment needed to run said selected test;

accessing said database to identify any equipment conflicts for said pieces of equipment needed to run said selected test;

accessing said database to identify an equipment list for each of said scheduled tests, said equipment lists for said scheduled tests comprising one or more pieces of equipment needed to run said scheduled tests; and comparing said equipment conflicts with said pieces of equipment needed to run said scheduled tests to identify said any conflicts between said selected test and said scheduled tests.

21. The test system of claim 20, wherein a conflict is identified if one of said equipment conflicts matches one of said pieces of equipment needed to run said scheduled tests.

22. The test system of claim 15, wherein said processor is further operable to determine an alternative start time for said selected test if one or more of said conflicts are identified.

23. The test system of claim 15, wherein said processor is further operable to run said selected test on said system at said selected start time.

24. The test system of claim 23, wherein said processor is further operable to verify that any prior scheduled tests have finished running before running said selected test on said system.

25. A test system for scheduling multiple tests on a single system residing in a single test environment, comprising:

means for receiving a request to run a selected test on said system at a selected start time;

means for determining a time slot for said selected test;

means for identifying any scheduled tests to be run on said system within said time slot;

means for identifying any conflicts between said selected test and said any scheduled tests; and means for scheduling said selected test to run on said system at said selected start time if none of said scheduled tests are identified or if none of said conflicts are identified.

26. The test system of claim 25, further comprising means for determining an alternative start time for said selected test if one or more of said conflicts are identified.

27. A computer-readable medium having computer-executable instructions for performing a method of scheduling multiple tests on a single system residing in a single test environment, said method comprising:

(a) receiving a request to run a selected test on said system at a selected start time;

(b) determining a time slot for said selected test;

(c) identifying any scheduled tests to be run on said system within said time slot;

(d) identifying any conflicts between said selected test and said any scheduled tests; and (e) if none of said scheduled tests are identified or if none of said conflicts are identified, scheduling said selected test to run on said system at said selected start time.

28. The computer-readable medium of claim 27, wherein said system is a telecommunications system comprising one or more pieces of telecommunications equipment selected from the following group: a switch, a host computer, a voice response unit, and combinations thereof.

29. The computer-readable medium of claim 27, wherein said method further comprises maintaining a database identifying a plurality of tests and corresponding run times, and wherein step (b) comprises:
- accessing said database to identify a run time for said selected test; and
- calculating said time slot based on said selected start time and said run time.

30. The computer-readable medium of claim 27, wherein said method further comprises maintaining a database identifying a plurality of time intervals and corresponding scheduled tests, and wherein step (c) comprises:
- partitioning said time slot into one or more time intervals;
- accessing said database to identify said any scheduled tests for said time intervals.

31. The computer-readable medium of claim 30, wherein step (e) comprise updating said database such that said selected test corresponds to each of said time intervals.

32. The computer-readable medium of claim 27, wherein said method further comprises maintaining a database identifying a plurality of tests and corresponding equipment lists, said database also identifying a plurality of pieces of equipment and corresponding equipment conflicts, and wherein step (d) comprises:
- accessing said database to identify an equipment list for said selected test, said equipment list for said selected test comprising one or more pieces of equipment needed to run said selected test;
- accessing said database to identify any equipment conflicts for said pieces of equipment needed to run said selected test;
- accessing said database to identify an equipment list for each of said scheduled tests, said equipment lists for said scheduled tests comprising one or more pieces of equipment needed to run said scheduled tests; and
- comparing said equipment conflicts with said pieces of equipment needed to run said scheduled tests to identify said any conflicts between said selected test and said scheduled tests.

33. The computer-readable medium of claim 32, wherein a conflict is identified if one of said equipment conflicts matches one of said pieces of equipment needed to run said scheduled tests.

34. The computer-readable medium of claim 27, wherein said method further comprises:
- (f) if one or more of said conflicts are identified, determining an alternative start time for said selected test that avoids said conflicts.

35. The computer-readable medium of claim 27, wherein said method further comprises:
- (f) running said selected test on said system at said selected start time.

36. The computer-readable medium of claim 35, wherein step (f) further comprises verifying that any prior scheduled tests have finished running before running said selected test on said system.

* * * * *